(12) United States Patent
Huang et al.

(10) Patent No.: US 7,346,969 B2
(45) Date of Patent: Mar. 25, 2008

(54) MACHINING METHOD USING MULTIPLE WORKPIECE MOUNTING DEVICE FOR MANUFACTURING STRUCTURES

(75) Inventors: Chin-Tsan Huang, Taipei Hsien (TW); Hsiang-Tai Tan, Taipei Hsien (TW); Xiao-Jiang Jiang, Shenzhen (CN); Zeng Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/556,119

(22) Filed: Nov. 2, 2006

(65) Prior Publication Data

US 2007/0209185 A1  Sep. 13, 2007

(30) Foreign Application Priority Data

Mar. 10, 2006  (CN)  .................... 2006 1 0034352

(51) Int. Cl.
*B23Q 5/22* (2006.01)
*B23C 9/00* (2006.01)

(52) U.S. Cl. .................. 29/38 R; 29/33 P; 29/38 B; 29/38 C; 269/57; 269/900; 409/219; 451/403; 451/414

(58) Field of Classification Search .............. 29/38 R, 29/33 P, 38 B, 38 C, 37 R, 38 A; 269/43, 269/900, 57, 72, 63; 409/219, 221, 224, 409/276, 277, 222, 223, 225; 451/403, 414
See application file for complete search history.

(56) References Cited

U.S. PATENT DOCUMENTS

| 4,242,167 A | * | 12/1980 | Hoffmann | .................... 156/357 |
| 5,212,857 A | * | 5/1993 | McMurtry | ................... 29/38 C |
| 5,395,174 A | * | 3/1995 | Koch et al. | .................. 156/384 |
| 5,535,995 A | * | 7/1996 | Swann et al. | .................. 269/43 |
| 5,562,277 A | * | 10/1996 | Swann et al. | .................. 269/43 |
| 5,735,514 A | * | 4/1998 | Moore et al. | .................. 269/43 |
| 6,185,802 B1 | * | 2/2001 | Gruber et al. | .............. 29/38 R |
| 6,629,345 B2 | * | 10/2003 | Albeck et al. | .............. 29/38 R |
| 2006/0277734 A1 | * | 12/2006 | Daris | ........................ 29/38 C |

* cited by examiner

Primary Examiner—Dana Ross
(74) Attorney, Agent, or Firm—Jeffrey T. Knapp

(57) ABSTRACT

A machining method for manufacturing structures includes a preprocessing step (11), a clamping step (13), a machining step (15) and an extracting step (19), which are performed in that order. The preprocessing step is performed to get workpieces (20a, 20b, 20c and 20d) for forming a plurality of structures. In the clamping step, fixedly clamping a plurality of workpieces on a multiple workpiece mounting device (30) and rotatably installing the multiple workpiece mounting device on machining equipment (50). In the machining step, machining the workpieces by the machining equipment to get structured workpieces. In the extracting step, extracting a plurality of structures from the structured workpiece. The invention is also related to an above-described multiple workpiece mounting device comprising a plurality of platforms (38) and a rotation axis (L1).

16 Claims, 5 Drawing Sheets

MACHINING METHOD USING MULTIPLE WORKPIECE MOUNTING DEVICE FOR MANUFACTURING STRUCTURES

BACKGROUND OF THE INVENTION

1. Field of the Invention

The present invention generally relates to a machining method using a multiple workpiece mounting device for manufacturing structures such as those used as components in mass manufactured products, and particularly to a machining method using a multiple workpiece mounting device for manufacturing irregular structures.

2. Discussion of the Related Art

With the advancement in manufacturing technologies, there are numerous methods employed for machining structures. In the manufacturing field, manufacturers allocate a lot of resources in choosing suitable methods to obtain desired structures on base workpieces. Especially in the case of irregular structures that need to go through a number of processes and procedures, it is very important to choose a highly efficient and low-cost method.

Irregular structures typically have complex shapes. Thus, a workpiece used in forming the irregular structure commonly has several surfaces needing to be processed. In general, after one surface of the workpiece is processed by one machine, the workpiece must be removed from the machine and then clamped in another orientation on the same machine or on another machine to process another surface. The workpiece may be removed and clamped several times until all of the to-be-processed surfaces thereof have been duly processed. If the irregular structures are processed one by one as above described, firstly, much time is needed in moving workpieces, clamping workpieces, adjusting positions of the workpieces, and adjusting parameters of the machines. In addition, because the workpieces are clamped once and again, errors that exist in performing each processing step are liable to accumulate. Thus, an acceptance rate (yield) of the structures may be unacceptably low. Furthermore, in the process of moving and clamping, the irregular structures are liable to be damaged by accidental bumping, scratching, pressing and so on.

Therefore, a machining method using a multiple workpiece mounting device which can achieve highly efficient production at low cost is desired.

SUMMARY

In one embodiment, a machining method for manufacturing a plurality of structures comprises: (1) providing a plurality of workpieces including a first workpiece and a second workpiece, each of the workpieces comprising at least one processing surface; (2) clamping the workpieces to respective mounting platforms on a multiple workpiece mounting device, and rotatably installing the multiple workpiece mounting device on machining equipment, the multiple workpiece mounting device defining a rotational axis about which the multiple workpiece mounting device can rotate, the mounting platforms being arranged evenly around the rotational axis; (3) machining the workpieces using the machining equipment, wherein when the multiple workpiece mounting device is at a first position, the machining equipment processes one processing surface of each of at least one of the workpieces including the first workpiece, when the multiple workpiece mounting device is rotated to a second position, the machining equipment processes one processing surface of each of at least another one of the workpieces including the second workpiece, and the multiple workpiece mounting device continues to process one processing surface of at the machining equipment continues to process one processing surface of at least a next one of the workpieces if and as necessary until eventually the at least one processing surface of each of the workpieces have all been machined, thereby forming a plurality of structured workpieces; and (4) extracting a plurality of structures from the structured workpieces.

The multiple workpiece mounting device includes a plurality of mounting platforms and a rotational axis. Each of the mounting platforms is aligned parallel to the rotational axis. A distance between the rotational axis and each of the mounting platforms is the same. The multiple workpiece mounting device is configured to rotate about the rotational axis.

Other advantages and novel features will become more apparent from the following detailed description when taken in conjunction with the accompanying drawings.

BRIEF DESCRIPTION OF THE DRAWINGS

The components in various drawings are not necessarily drawn to scale, the emphasis instead being placed upon clearly illustrating the principles of the machining method using a multiple workpiece mounting device. Moreover, in the drawings, like reference numerals designate corresponding parts throughout several views.

DETAILED DESCRIPTION OF THE EMBODIMENTS

Figure 1:
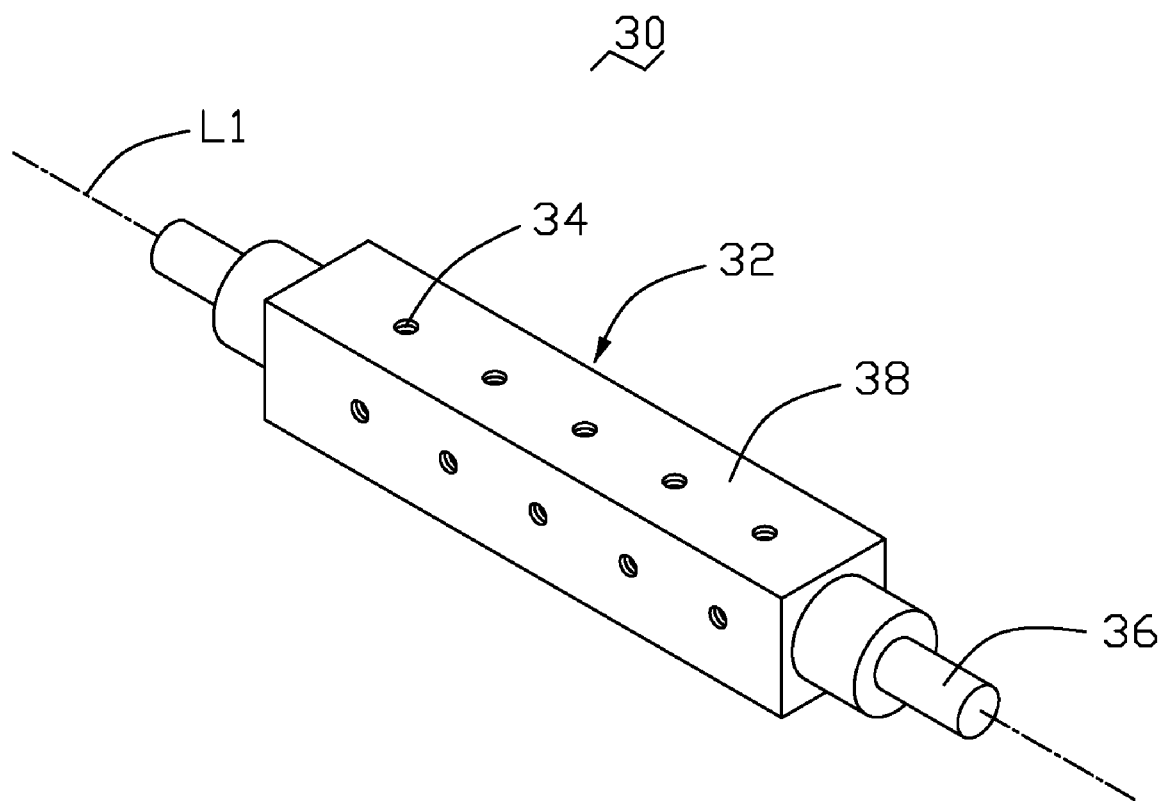
FIG. 1 is an isometric view of a multiple workpiece mounting device used in a machining method of one embodiment of the present invention.

Referring to the drawings in detail, FIG. 1 shows a multiple workpiece mounting device used in a machining method of one embodiment of the present invention. The multiple workpiece mounting device 30 includes a mounting portion 32, and two clamping ends 36 disposed at two opposite ends of the mounting portion 32. The mounting portion 32 may take a shape of a regular prism such as an equilateral triangular prism, an equilateral pentagonal prism, or an equilateral hexagonal prism. In this embodiment, the mounting portion 32 is an elongated square prism. The clamping ends 36 are cylinder-shaped. The mounting portion 32 has four mounting platforms 38, each defining a plurality of mounting holes 34 arrayed along a line parallel to a rotational axis L1 of the multiple workpiece mounting device 30. The mounting holes 34 are typically screw holes. The multiple workpiece mounting device 30 rotates around the rotational axis L1. The rotational axis L1 runs parallel to each of the mounting platforms 38, and also coincides with axes of symmetry of opposite of the mounting platforms 38. Further, a distance between the rotational axis L1 and each of the mounting platforms 38 is the same.

Figure 2:
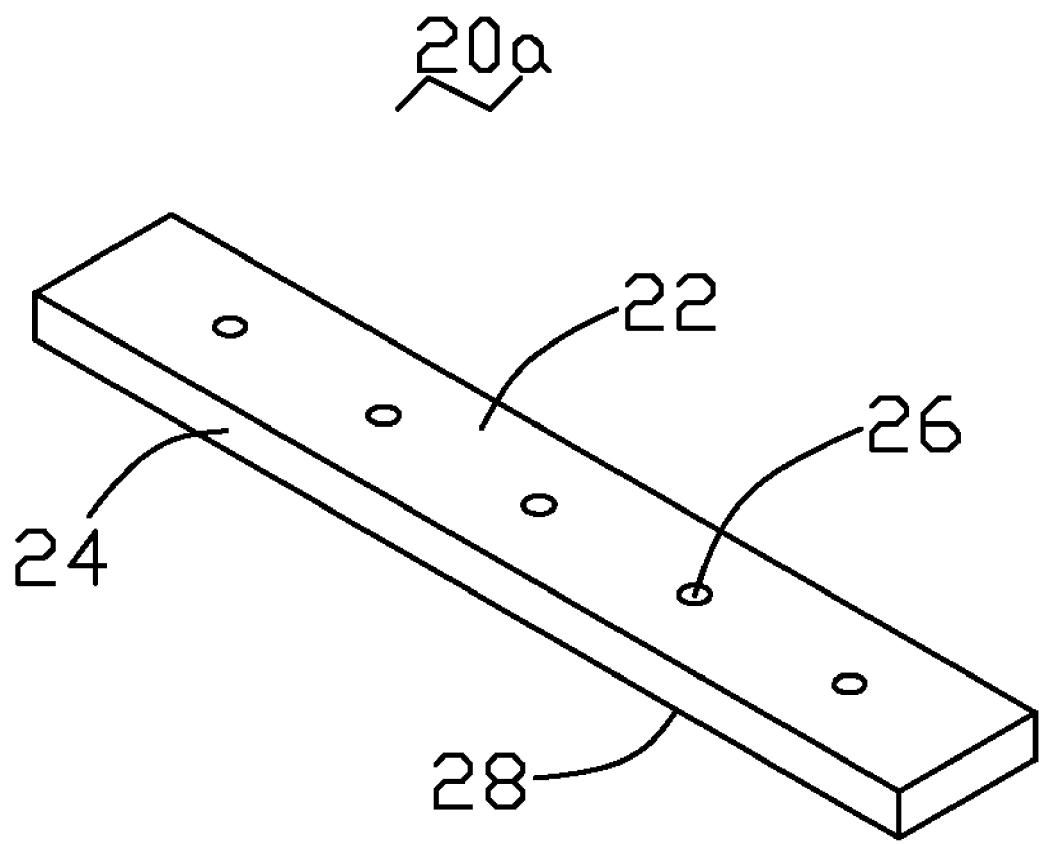
FIG. 2 is an isometric view of an exemplary workpiece needing to be processed.

A machining method for manufacturing irregular-shaped structures is also provided herein. An exemplary embodiment of the machining method involves processing a number of workpieces such as a few of the workpieces 20a shown in FIG. 2. Each workpiece 20a has a predetermined size and a predetermined shape. The workpiece 20a needs to be processed in multiple directions and on multiple surfaces to form a plurality of irregular-shaped structures therefrom. In other words, the workpiece 20a has multiple processing surfaces. In this embodiment, the workpiece 20a is a rod including a main processing surface 22, and two side processing surfaces 24 located at two adjacent sides of the main processing surface 22 respectively. That is, the side processing surfaces 24 are at opposite sides of the workpiece 20a. The workpiece 20a further includes a mounting surface 28 that is on the opposite side to the main processing surface 22. The workpiece 20a defines a plurality of mounting through-holes 26 communicating between the main processing surface 22 and the mounting surface 28. The mounting through-holes 26 correspond to the mounting holes 34 of the multiple workpiece mounting device 30.

Figure 3:
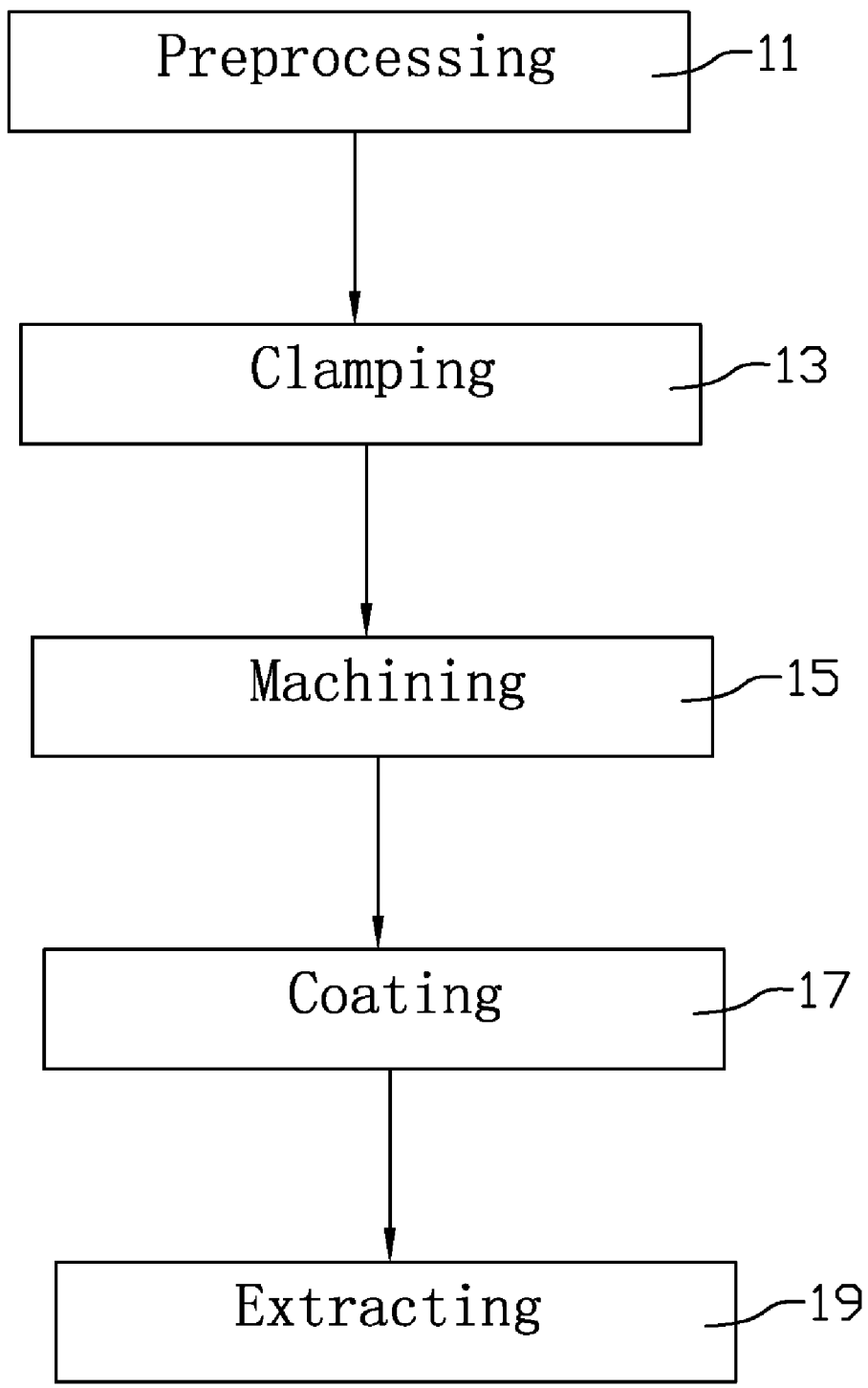
FIG. 3 is a flow chart of an exemplary machining method for manufacturing structures using the multiple workpiece mounting device of FIG. 1 to process a plurality of workpieces of FIG. 2.

Referring to FIG. 3, the exemplary machining method for manufacturing structures includes a preprocessing step 11, a clamping step 13, a machining step 15, a coating step 17, and an extracting step 19, which are performed in that order. One preferred embodiment of the machining method for manufacturing structures is described in detailed as follows:

In the preprocessing step 11: At least one of the above-described workpieces 20a is provided. In the preferred embodiment, extrusion press equipment (not shown) machines the workpiece 20a. A drilling machine (not shown) drills the mounting through-holes 26 in the workpiece 20a. Alternatively, the workpiece 20a may be formed by other kinds of metal working/machining devices such as die casting machines, according to different conditions such as what material the workpiece 20a is made of.

Figure 4:
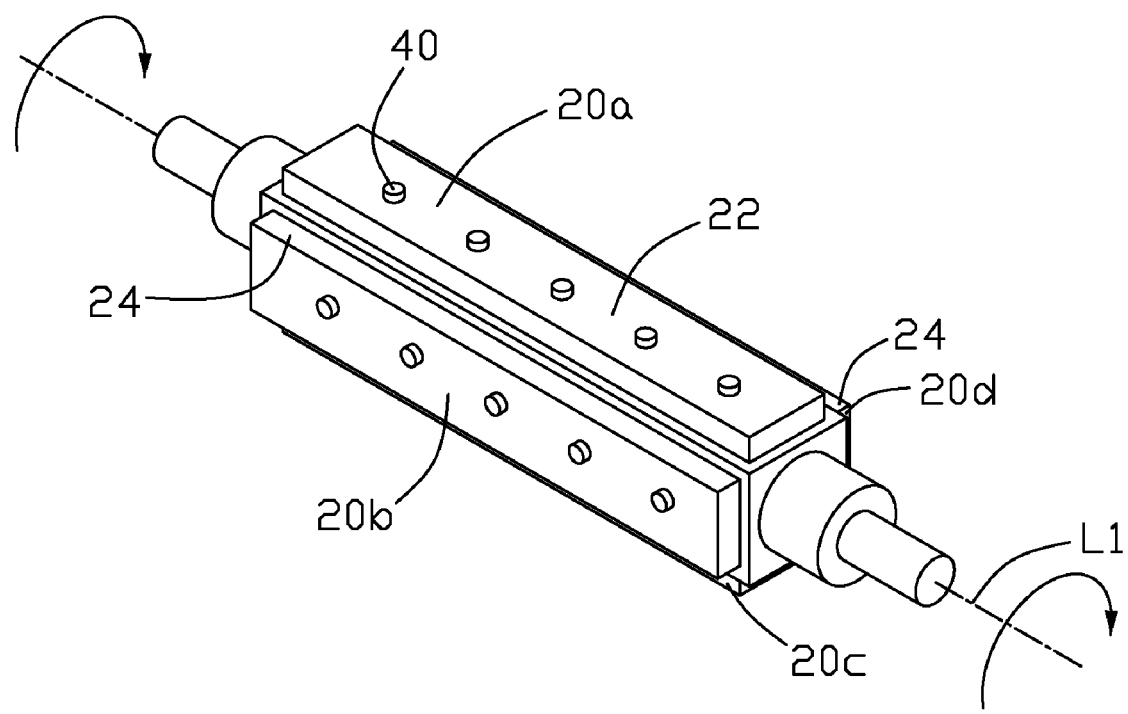
FIG. 4 is similar to FIG. 1, but showing a plurality of workpieces of FIG. 2 attached onto the multiple workpiece mounting device.

In the clamping step 13: The at least one workpiece 20a is mounted to the above-described multiple workpiece mounting device 30, and the multiple workpiece mounting device 30 is installed onto a rotatable clamp of machining equipment. In the preferred embodiment, referring to FIG. 4, three additional workpieces 20b, 20c, and 20d are mounted to the multiple workpiece mounting device 30. The workpieces 20a, 20b, 20c, and 20d are substantially the same. The workpieces 20a, 20b, 20c, and 20d are correspondingly fixed on four mounting platforms 38 of the multiple workpiece mounting device 30 by fixing pieces 40 such as bolts, screws, pegs, or pins. Each fixing piece 40 is inserted into one of the mounting through-holes 26 that is aligned with one corresponding mounting hole 34 of the multiple workpiece mounting device 30. The mounting surface 28 of each of the workpieces 20a, 20b, 20c, and 20d abuts a corresponding one of the mounting platforms 38 of the multiple workpiece mounting device 30.

Figure 5:
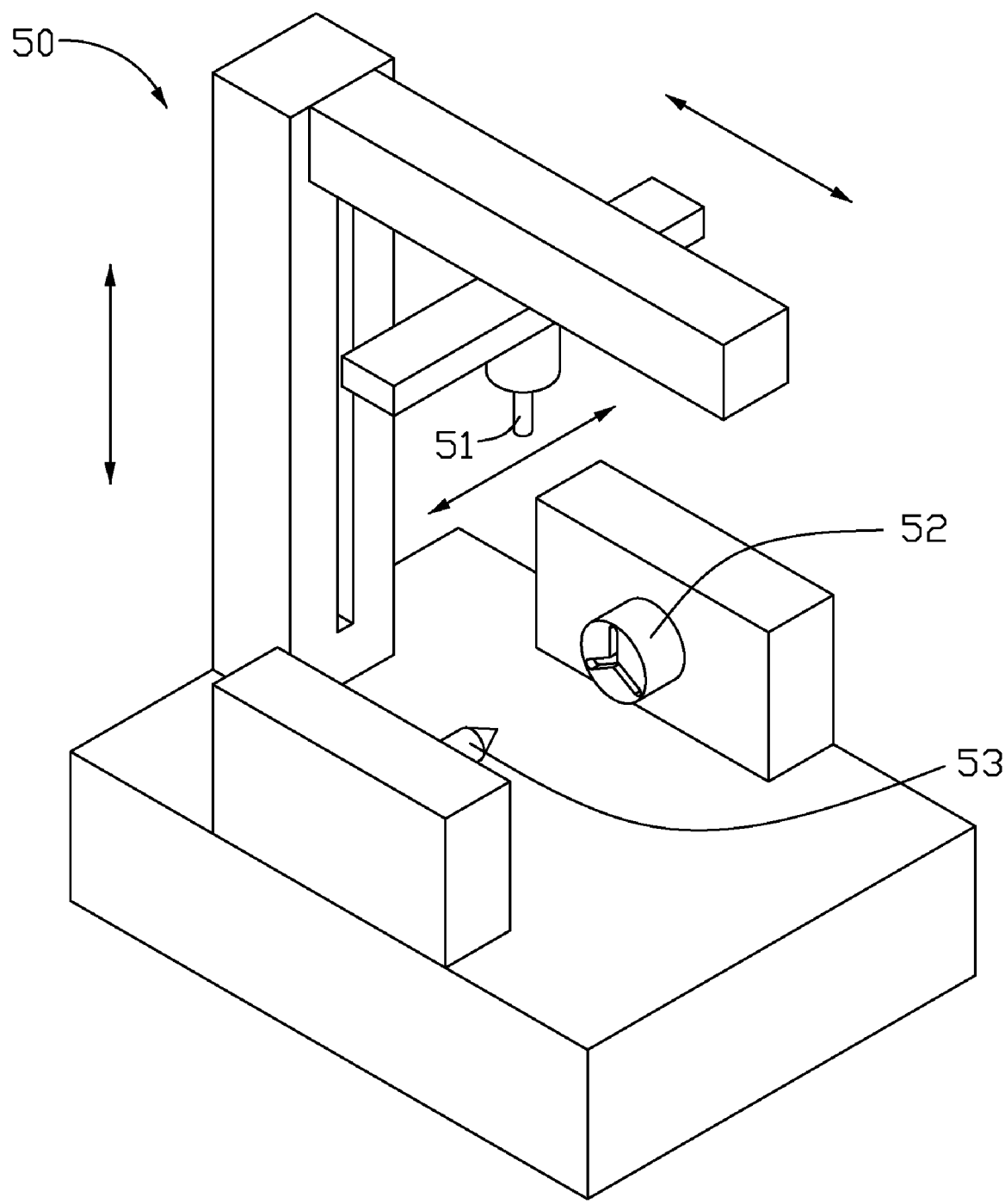
FIG. 5 is a schematic, isometric view of machining equipment used in the method of FIG. 3.

In the machining step 15: The machining equipment works on the main and side processing surfaces 22, 24 of each workpiece 20a, 20b, 20c, and 20d to obtain four structured workpieces. The machining equipment includes a machining tool. In the preferred embodiment, referring to FIG. 5, the machining equipment is a computerized numerical control (CNC) machine 50. The CNC machine 50 includes a machining tool 51 installed on a movable worktable, which is movable in multiple directions. The rotatable clamp of the CNC machine 50 includes a three-jaw chuck 52 and a spring tip 53. The multiple workpiece mounting device 30 is rotatably clamped on the CNC machine 50 between the three-jaw chuck 52 and the spring tip 53. The CNC machine 50 synchronously machines the main processing surface 22 of the workpiece 20a mounted on one of the mounting platforms 38 of the multiple workpiece mounting device 30 and one side processing surface 24 of each of the workpieces 20b and 20d mounted on two adjacent mounting platforms 38 of the multiple workpiece mounting device 30. In one of numerous possible examples, the CNC machine 50 may drill a large hole in said main processing surface 22, and a small hole in each of said side processing surfaces 24. After that, the multiple workpiece mounting device 30 is rotated an angle of 90 degrees in a direction shown by the arrows in FIG. 4. Then, the CNC machine 50 machines the main processing surface 22 of the workpiece 20b and one side processing surface 24 of each of the workpieces 20a and 20c. In the same example, the CNC machine 50 drills a large hole in said main processing surface 22, and a small hole in each of said side processing surfaces 24. Next, the multiple workpiece mounting device 30 is rotated a further angle of 90 degrees in the direction shown by the arrows in FIG. 4. In this manner, the CNC machine 50 machines the workpieces 20a, 20b, 20c, and 20d further until the main processing surface 22 and the side processing surfaces 24 of each of the workpieces 20a, 20b, 20c and 20d are all machined. Thereby, the four structured workpieces are formed. While machining each main and side processing surface 22, 24, the machining tool 51 is moved together with the worktable along a path determined by a program installed in the CNC machine 50 beforehand. A type of the machining tool 51 may be changed in this machining step 15. For example, if the workpieces 20a, 20b, 20c, and 20d need to be machined by a cutting tool, a drilling tool, and a milling cutter, the machining tool 51 is changed twice during the machining step 15. A procedure in changing the type of the machining tool 51 is controlled by the program installed in the CNC machine 50 beforehand.

In the coating step 17: The surfaces of the structured workpieces are coated. The coating method may be a spray-paint method, or an electroplating method, and so on, according to different requirements of the irregular-shaped structures. Thereby, surfaces of the structured workpieces having predetermined desired characteristics are obtained; for example, smooth surfaces or hard surfaces are obtained. In the preferred embodiment, the coating step 17 includes a cleaning step, a masking step, and an anodizing step. In the cleaning step, a cleaning machine cleans the surfaces of the structured workpieces.

In the extracting step 19: A plurality of irregular-shaped structures is extracted from the structured workpieces. In the preferred embodiment, the structured workpieces are run through a punching machine so as to separate the irregular-shaped structures from the remaining portions of the structured workpieces. Alternatively, the irregular-shaped structures may be separated by use of equipment such as a shearing machine.

After the extracting step 19, labels are pasted on each of the irregular-shaped structures. Alternatively, there may be no labels pasted on the irregular-shaped structures. Then the irregular-shaped structures are packed manually or by packing machines for transportation or shipment.

In alternative embodiments, the drilling step of the preprocessing step 11 may be omitted. In such case, the workpieces 20a, 20b, 20c, and 20d are mounted on the multiple workpiece mounting device 30 by other means. For example, the multiple workpiece mounting device 30 can have a plurality of clasps to clasp the workpieces 20a, 20b, 20c, and 20d. When the quality of the surfaces of the irregular-shaped structures is not required to be high, the coating step 17 may be omitted. More than one multiple workpiece mounting device 30 may be mounted on a modified version of the CNC machine 50. In such case, the workpieces 20a, 20b, 20c, and 20d on each of the multiple workpiece mounting devices 30 are machined simultaneously, with the multiple workpiece mounting devices 30 being rotated synchronously. The workpieces 20a, 20b, 20c, 20d may each comprise only one processing surface. In such case, the workpieces 20a, 20b, 20c, 20d can be mounted on the multiple workpiece mounting device 30 in the manner described above. The machining equipment machines the processing surface of the workpiece 20a first. Then the multiple workpiece mounting device 30 is rotated 90 degrees, and the processing surface of the workpiece 20b is processed. Next, the multiple workpiece mounting device 30 is rotated a further angle of 90 degrees. In this manner, the machining equipment goes on to machine the workpieces 20c and 20d. Thus the processing surface of each workpiece 20a, 20b, 20c, and 20d are all machined.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A machining method for manufacturing a plurality of structures, the method comprising:
    (1) providing a plurality of workpieces including a first workpiece and a second workpiece, each of the workpieces comprising at least one processing surface;
    (2) clamping the workpieces to respective mounting platforms on a multiple workpiece mounting device, and rotatably installing the multiple workpiece mounting device on machining equipment, the multiple workpiece mounting device defining a rotational axis about which the multiple workpiece mounting device can rotate, the mounting platforms being arranged evenly around the rotational axis;
    (3) machining the workpieces using the machining equipment, wherein when the multiple workpiece mourning device is at a first position, the machining equipment processes one processing surface of each of at least one of the workpieces including the first workpiece, when the multiple workpiece mounting device is rotated to a second position, the machining equipment processes one processing surface of each of at least another one of the workpieces including the second workpiece, and the multiple workpiece mounting device continues to be rotated if and as necessary and the machining equipment continues to process one processing surface of at least a next one of the workpieces if and as necessary until eventually the at least one processing surface of each of the workpieces have all been machined, thereby forming a plurality of structured workpieces; and
    (4) extracting a plurality of structures from each of the structured workpieces.

2. The machining method as claimed in claim 1, further comprising drilling a plurality of mounting through-holes in the workpieces prior to clamping the workpieces.

3. The machining method as claimed in claim 2, further comprising forming the workpieces using extrusion press equipment prior to drilling the mounting through-holes.

4. The machining method as claimed in claim 2, wherein the machining equipment comprises a tool installed on a movable worktable, and when the machining equipment processes each processing surface, each of the tool and the worktable is moved along a path determined by a program in the machining equipment.

5. The machining method as claimed in claim 4, wherein the multiple workpiece mounting device comprises a mounting portion and two clamping ends disposed at two opposite ends of the mounting portion, the mounting portion has a shape of a regular prism, the clamping ends are used to rotatably attach the multiple workpiece mounting device on the machining equipment, the multiple workpiece mounting device defines a plurality of mounting holes on each mounting platform, and a fixing piece is inserted into each mounting through-hole and one corresponding mounting hole to fix the workpieces on the multiple workpiece mounting device.

6. The machining method as claimed in claim 5, wherein the mounting portion has a shape of one of an equilateral triangular prism, a square prism, an equilateral pentagonal prism, and an equilateral hexagonal prism.

7. The machining method as claimed in claim 5, wherein the mounting portion of the multiple workpiece mounting device is a square prism having four mounting platforms each having one workpiece mounted thereon, each workpiece has three processing surfaces including a main processing surface and two side processing surfaces adjacent to the main processing surface, and a mounting surface that is on the opposite side to the main processing surface, and the mounting surface abuts a corresponding one of the mounting platforms of the multiple workpiece mounting device.

8. The machining method as claimed in claim 7, wherein the machining equipment synchronously machines the main processing surface of one workpiece mounted on one of the mounting platforms and one side processing surface of each of two other workpieces mounted on two adjacent mounting platforms, after that, the multiple workpiece mounting device is rotated 90 degrees, then, the machining equipment machines the main processing surface of one of said two other workpieces and one side processing surface of each of said one workpiece and still another workpiece, next, the multiple workpiece mounting device is further rotated 90 degrees as necessary, and the machining equipment continues to machine a corresponding main processing surface and corresponding side processing surfaces of corresponding of the workpieces as necessary until the main processing surface and the two side processing surfaces of each of the workpieces have all been machined.

9. The machining method as claimed in claim 1, further comprising coating the structured workpieces before extracting the structures.

10. The machining method as claimed in claim 9, wherein the coating comprises a cleaning step, a masking step, and an anodizing step.

11. The machining method as claimed in claim 9, wherein the coating utilizes a spray-paint method or an electroplating method.

12. The machining method as claimed in claim 1, wherein the structures are extracted by separating each structure from a remainder of the corresponding structured workpiece by using a machine selected from the group consisting of a punching machine and a shearing machine.

13. The machining method as claimed in claim 1, further comprising, after extracting the structures, pasting a label on each of the structures and packing the structures.

14. The machining method as claimed in claim 1, wherein the workpieces each comprise one processing surface, and when the multiple workpiece mounting device is rotated to each of the positions including the first position and the second position, the machining equipment processes the processing surface of a respective one of the workpieces.

15. The machining method as claimed in claim 1, wherein the mounting platforms are parallel to the rotational axis, and a distance between the rotational axis and each of the mounting platforms is the same.

16. A machining method for manufacturing a plurality of structures, the method comprising:
   (1) providing a plurality of workpieces each comprising one processing surface;
   (2) clamping the workpieces on a multiple workpiece mounting device having a plurality of platforms, and rotatably installing the multiple workpiece mounting device on machining equipment, the multiple workpiece mounting device defining a rotational axis about which the multiple workpiece mounting device can rotate, each workpiece being mounted on a respective one of the mounting platforms;
   (3) machining the workpieces using the machining equipment, wherein when the multiple workpiece mounting device is at a first position, the machining equipment processes the processing surface of one workpiece, when the multiple workpiece mounting device is rotated to a second position, the machining equipment processes the processing surface of another workpiece, and the multiple workpiece mounting device continues to be rotated if and as necessary and the machining equipment continues to process the processing surface of at least a next one of the workpieces if and as necessary until eventually the processing surface of each of the workpieces have all been machined, thereby forming a plurality of structured workpieces; and
   (4) extracting a plurality of structures from each of the structured workpieces.

* * * * *